(12) United States Patent  
Towliat (10) Patent No.: US 7,736,149 B2
(45) Date of Patent: Jun. 15, 2010

(54) OPERATING ROOM DISPLAY AND RELATED METHODS

(76) Inventor: Faye F. Towliat, 2455 Camino Del Sol, Fullerton, CA (US) 92833

( * ) Notice: Subject to any disclaimer, the term of this patent is extended or adjusted under 35 U.S.C. 154(b) by 1295 days.

(21) Appl. No.: 11/080,158

(22) Filed: Mar. 15, 2005

(65) Prior Publication Data

US 2006/0078860 A1 Apr. 13, 2006

Related U.S. Application Data

(60) Provisional application No. 60/614,123, filed on Sep. 29, 2004.

(51) Int. Cl.
G09B 23/28 (2006.01)
(52) U.S. Cl. ................................. 434/267
(58) Field of Classification Search .......... 434/262–275; 283/81; 235/462.01, 462.08, 462.15; 705/2, 705/3
See application file for complete search history.

(56) References Cited

U.S. PATENT DOCUMENTS

| | | | |
|---|---|---|---|
| 3,651,512 A | 3/1972 | Summers | |
| 4,561,851 A | 12/1985 | Ferreira et al. | |
| 4,947,867 A * | 8/1990 | Keeton | 128/846 |
| 5,259,764 A * | 11/1993 | Goldsmith | 434/267 |
| RE34,800 E | 11/1994 | Hutchins | |
| 5,678,569 A | 10/1997 | Chew et al. | |
| 5,720,502 A * | 2/1998 | Cain | 283/115 |
| 5,790,216 A | 8/1998 | Inbar et al. | |
| 5,791,907 A | 8/1998 | Ramshaw et al. | |
| 5,944,531 A | 8/1999 | Foley et al. | |
| 6,428,321 B1 * | 8/2002 | Jurmain et al. | 434/238 |
| 7,389,928 B2 * | 6/2008 | Lubow | 235/462.01 |
| 2001/0045037 A1 | 11/2001 | Bank et al. | |
| 2002/0179094 A1 | 12/2002 | Perlow | 128/897 |
| 2003/0182815 A1 | 10/2003 | Carlson, II | 33/566 |
| 2003/0184081 A1 | 10/2003 | Carlson, II | 283/67 |
| 2003/0204411 A1 | 10/2003 | Beyersdorf | |
| 2004/0044546 A1 | 3/2004 | Moore | |
| 2004/0056478 A1 * | 3/2004 | Bruce | 283/81 |
| 2004/0236315 A1 | 11/2004 | Hered | 606/1 |
| 2004/0236871 A1 | 11/2004 | Waxman | 710/1 |
| 2005/0029145 A1 | 2/2005 | Krackow | 206/459.5 |

FOREIGN PATENT DOCUMENTS

JP 5115462 5/1993

* cited by examiner

*Primary Examiner*—Xuan M Thai
*Assistant Examiner*—Timothy Musselman (57) ABSTRACT

Method for preventing surgical errors comprises: (a) viewing a display having a start indicator and a stop indicator where only one of the start and stop indicators is highlighted; and (b) determining whether to proceed with a surgical procedure based on whether the start indicator or the stop indicator is highlighted. A confirmation board apparatus comprises: (a) an image of a human body that is visibly divided into sections; and (b) a mechanism for visibly highlighting individual sections of the image.

19 Claims, 6 Drawing Sheets

OPERATING ROOM DISPLAY AND RELATED METHODS

CROSS-REFERENCES TO RELATED APPLICATIONS

This application claims the benefit of Provisional Application No. 60/614,123, filed Sep. 29, 2004, herein incorporated by reference in its entirety.

FIELD OF THE INVENTION

The present invention relates generally to methods and apparatus for reducing the risk of errors occurring during surgical procedures.

BACKGROUND OF THE INVENTION

Unfortunately, having a surgical procedure performed on the wrong person, or at the wrong site on a person, occurs all to frequently. Attempts have been made to prevent such surgical errors from occurring. Many of these involve marking a portion of a persons body as the correct site for a surgical procedure, or marking a site that might be mistaken for the procedure site as an incorrect site. Examples of marking apparatus and methods can be found in U.S. patent application Ser. Nos. 09/865,563, 10/108,320, 10/112,235, 10/423,803, and 10/444,532. Another approach, described in U.S. patent application Ser. No. 10/638,245, involves placing necessary surgical tools inside a container with reminders relating to the person, procedure, and site the tools are to be used on or for. Yet another approach, described in U.S. patent application Ser. No. 10/446,007, involves attaching a microchip containing patient and procedure related information to a patient for removal and scanning just prior to surgery.

Despite such attempts at preventing surgical errors from occurring, it is believed that the occurrence of such errors can be further reduced through the use of appropriate apparatus and methods. The present invention attempts to provide such methods and apparatus.

SUMMARY OF THE INVENTION

This disclosure relates generally to methods and apparatus for reducing the risk of errors occurring during surgical procedures. One exemplary embodiment is a method for preventing surgical errors comprising: (a) viewing a display having a start indicator and a stop indicator where only one of the start and stop indicators is highlighted; and (b) determining whether to proceed with a surgical procedure based on whether the start indicator or the stop indicator is highlighted. Another exemplary embodiment is a confirmation board apparatus comprising: (a) an image of a human body that is visibly divided into sections; and (b) a mechanism for visibly highlighting individual sections of the image.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

It is contemplated that the risk of errors occurring during surgical procedures can be decreased through the use of a confirmation procedure that utilizes a display visible to operating personnel. Such a display can be used to communicate to such personnel, preferably while they are in the operating room, one or more of the following: (a) the section of a patient's body that is the subject of the surgical procedure; (b) whether key personnel have confirmed the location such that the procedure can begin; and (c) which and/or how many key personnel have and have not confirmed the location. An apparatus that accomplishes at least (a) and (b) is referred to herein as a "confirmation board apparatus" or simply as a "confirmation board".

Figure 1:
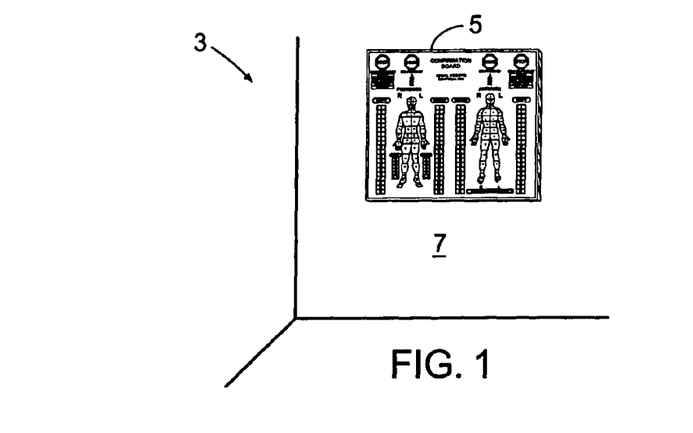
FIG. 1 is a partial perspective view of an operating room including a wall mounted confirmation board apparatus in accordance with an exemplary embodiment of the invention.

In FIG. 1, an operating room 3 includes a confirmation board 5 mounted on an interior operating room wall 7. The confirmation board 5 is preferably mounted at a location and in a manner that makes it readily visible to operating room personnel utilizing the room 3 to perform a surgical procedure. The board 5 preferably includes an image of a human body that is visibly divided into sections (i.e. adjacent sections can be individually identified by viewing the image), and a mechanism for visibly highlighting individual sections of the image so that the site at which a pending operation is to be performed (the "procedure site") can be confirmed by looking at the confirmation board. As such, having the confirmation board 5 visible to operating room personnel facilitates viewing the confirmation board to confirm that the site shown on the board corresponds to the site at which a procedure is about to be performed, and to confirm that the procedure is authorized to begin.

To allow the board 5 to be used to provide a visual indicator of what the site of a procedure is, a section of the image of the human body on the board 5 is highlighted. The term "highlighted" as used herein, simply indicates that a section is made to stand out from other sections, possibly by being backlit, such that the section is readily seen to have been selected while other sections were not selected. The step of highlighting a section of image, however such selection may be made, will sometimes be referred to herein as "site selection". Site selection is preferably performed by an operating room nurse, or some other person having the responsibility for determining the correct site for a surgical procedure and making sure the section corresponding to that site is highlighted on the confirmation board. In some instances, site selection may require input from more than one person in order to minimize the chance of incorrect site selection occurring.

Before a surgical procedure begins, it is also preferred that certain key personnel be required to take a step showing that they have seen which section was highlighted, i.e. that they take a step to actively confirm that they have reviewed the site selection. Active confirmation on the part of such personnel helps reduce the chance that one or more of them will forget to review the site selection before beginning a procedure. It is contemplated that in some instances confirmation by key personnel will also indicate that site selection was done properly, i.e. the site selected is actually the site at which the procedure is to occur. In some instances, key personnel may be required to also verify that the correct patient is in the operating room and that the correct procedure is about to be performed before providing active confirmation. Where active confirmation is part of the procedure being followed, it is preferred that the confirmation board 5 also confirm that the procedure is authorized to begin, i.e. that required personnel have actively confirmed the site selection.

Figure 2:
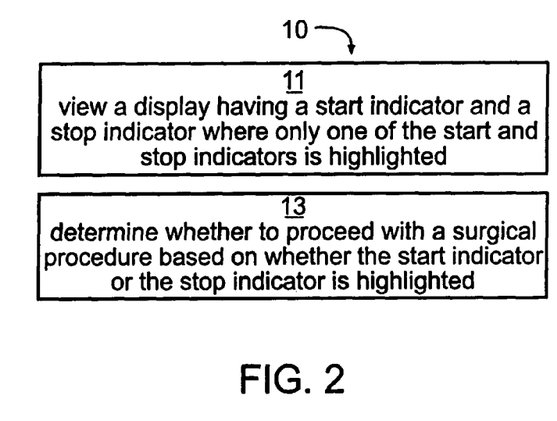
FIG. 2 is a table illustrating steps of a first method for preventing surgical errors in accordance with an exemplary embodiment of the invention.
Figure 3:
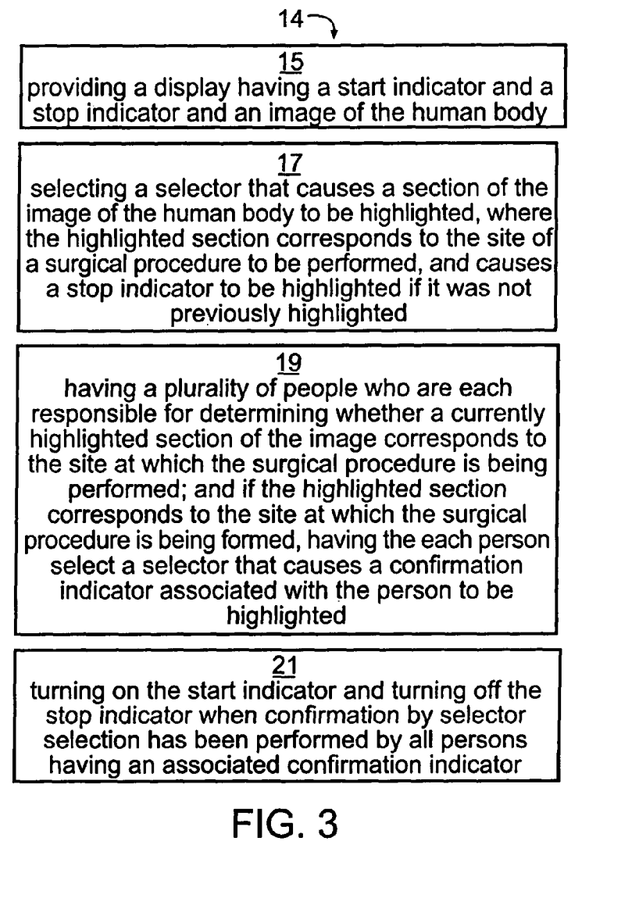
FIG. 3 is a table illustrating steps of a second method for preventing surgical errors in accordance with an exemplary embodiment of the invention.

In some instances, a confirmation board will include one or more indicators dedicated to showing whether authorization to begin has been obtained. As an example, a confirmation board might include a start indicator that is highlighted only after key personnel have actively confirmed the site selection and the procedure is authorized to begin. Such a board could be advantageously used in a method for preventing surgical errors as shown in FIG. 2. As can be seen, the method 10 includes a first step 11 where operating room personnel view a display having a start indicator and a stop indicator where only one of the start and stop indicators is highlighted; and a step 13, where the personnel determine whether to proceed with a surgical procedure based on whether the start indicator or the stop indicator is highlighted. In FIG. 3, another exemplary method 14 includes the following steps: step 15, providing a display having a start indicator and a stop indicator and an image of the human body; step 17, selecting a selector that causes a section of the image of the human body to be highlighted, where the highlighted section corresponds to the site of a surgical procedure to be performed, and causes a stop indicator to be highlighted if it was not previously highlighted; step 19, having a plurality of people who are each responsible for determining whether a currently highlighted section of the image corresponds to the site at which the surgical procedure is being performed, and if the highlighted section corresponds to the site at which the surgical procedure is being formed, having the each person select a selector that causes a confirmation indicator associated with the person to be highlighted; and step 21, turning on the start indicator and turning off the stop indicator when confirmation by selector selection has been performed by all persons having an associated confirmation indicator.

In other instances, such authorizations may be part of the site selection process such that highlighting of a section on the board indicates that authorization to begin has been obtained.

Figure 4:
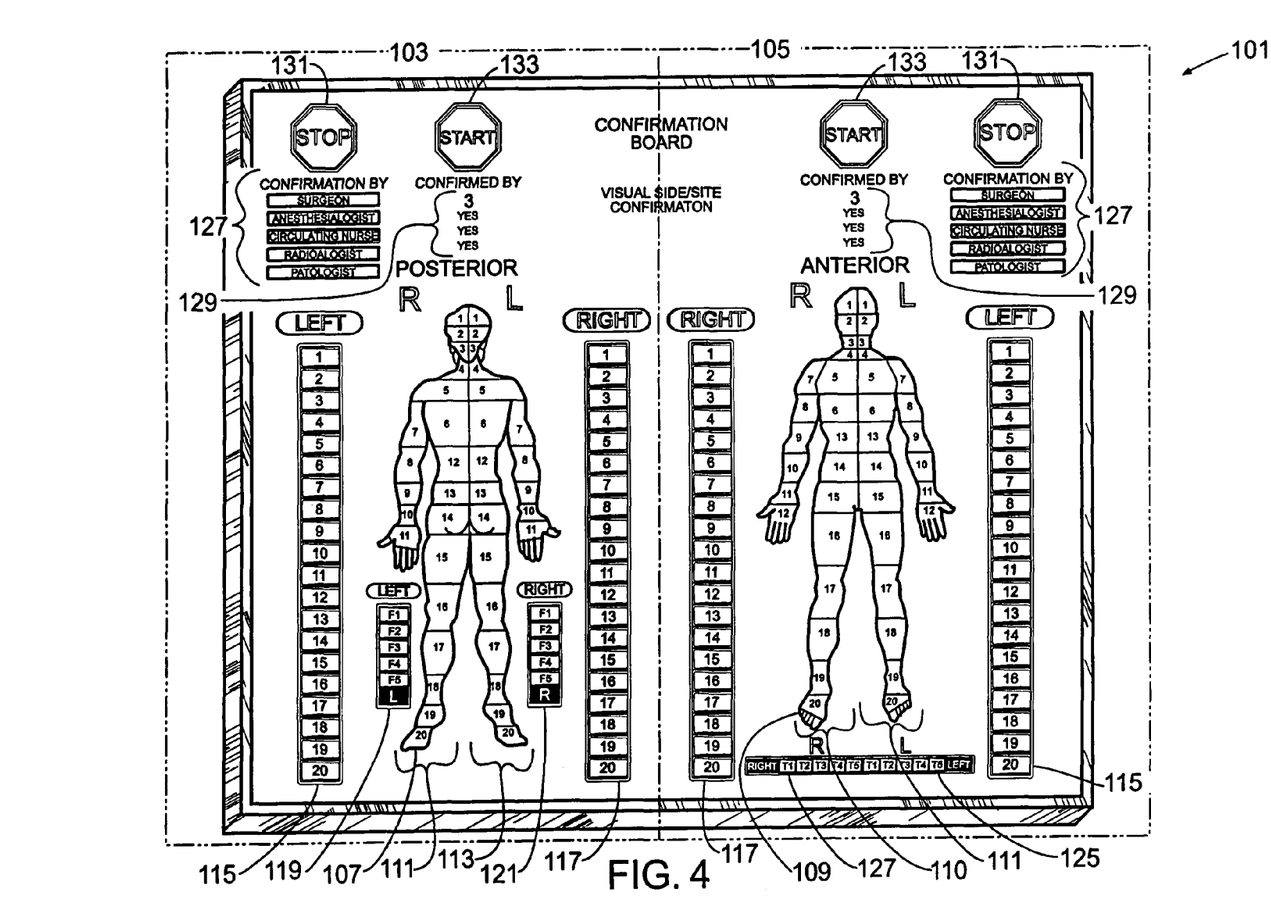
FIG. 4 is perspective view of a confirmation board apparatus in accordance with an exemplary embodiment of the invention.

The methods described, and other methods of preventing surgical errors from occurring, may advantageously use the confirmation board apparatus 101 of FIG. 4. In FIG. 4, a confirmation board apparatus 101 comprises a first, posterior, board segment 103 (i.e. the left half of board 101), and a second, anterior, board segment 105 (i.e. the right half of board 101). Each of the board segments 103 and 105 includes a view (107 or 109) of the human body, with a posterior view 107 being shown on the posterior board segment 103, and an anterior view 109 being shown on the anterior board segment 105. Each of the views 107 and 109 is divided into left and right sides 111 and 113. Each of the sides 111 and 113 is divided into 20 sections, each section being associated with a numeric key (1-20). Each finger of one view and each toe of another view is also a section, and is associated with an alphanumeric key. Each of the board segments 103 and 105 includes a left side set of selectors 115 and a right side set of selectors 117. The posterior board segment 103 also includes left finger selector set 119, and right finger selector set 121. The anterior board segment 105 includes left toe selector set 123, and right toe selector set 125. Each of the board segments 103 and 105 also includes a set of authorized personnel selectors 127, a set of confirmation indicators 129, a red stop indicator 131, and a green start indicator 133.

Figure 5:
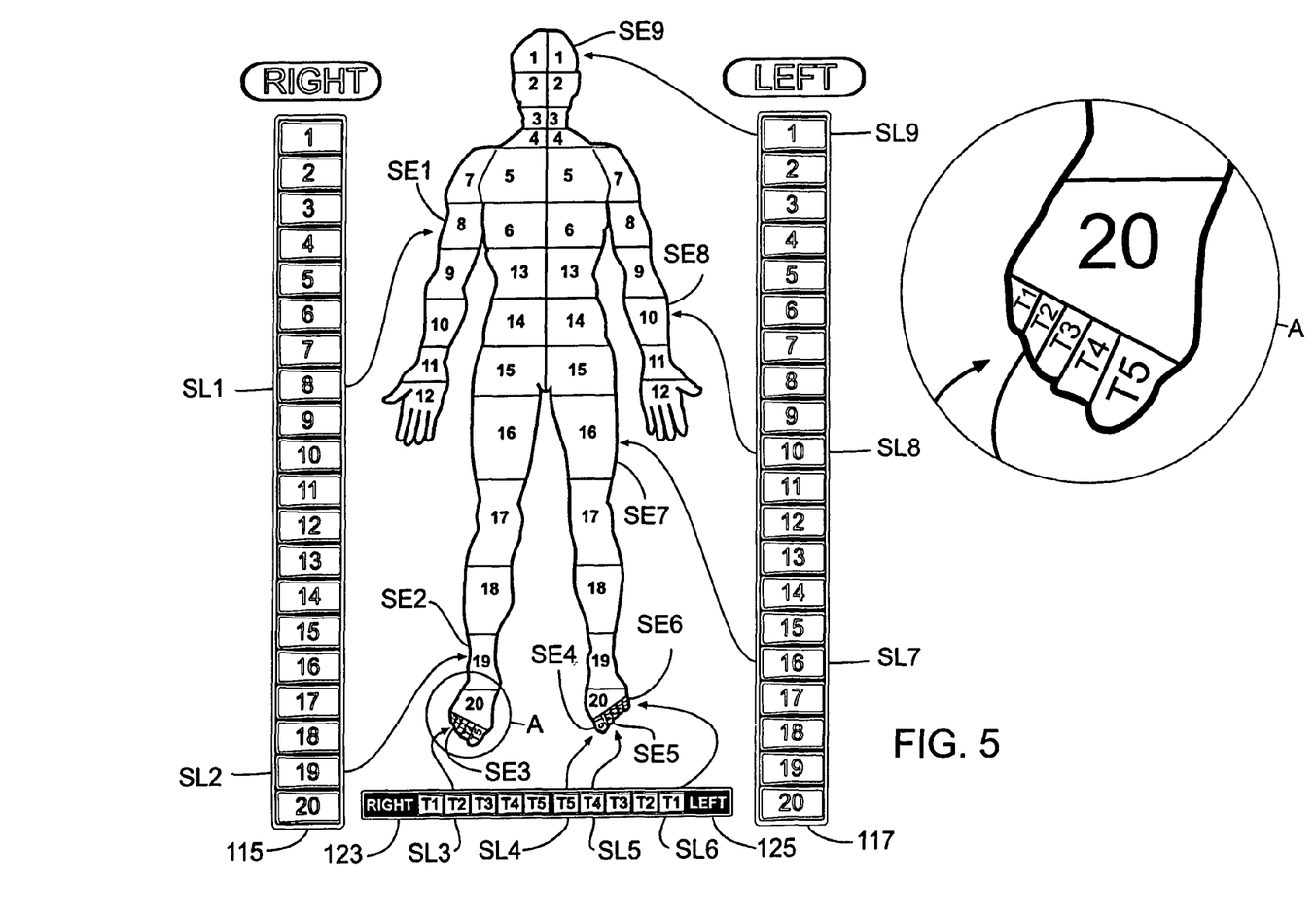
FIG. 5 is a front view of a portion of the right half of the confirmation board of FIG. 4.
Figure 6:
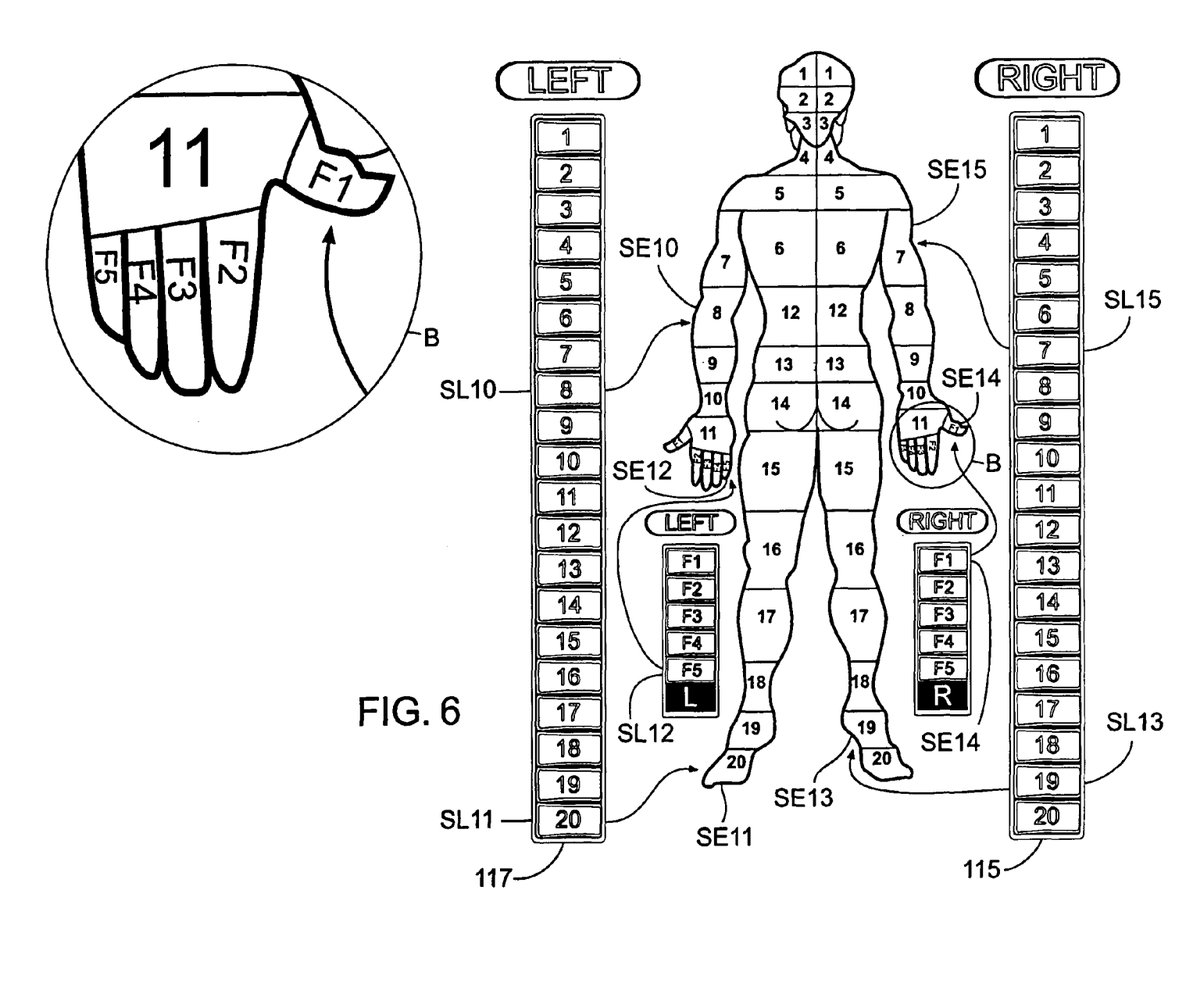
FIG. 6 is a front view of a portion of the left half of the confirmation board of FIG. 4.

Each section (1-20, F1-F5, T1-T5) has an associated selector used to cause the section to be highlighted when the selector is selected. As such, each selector of the selectors sets 115, 117, 119, 121, 123, and 125 corresponds to a section (1-20) of the left side 111 or right side 113 of one of the views 107 and 109. This is illustrated in FIGS. 5 and 6 in which selector SL1 corresponds to section SE1, selector SL2 to section SE2, selector SL3 to section SE3, selector SL4 to section SE4, selector SL5 to section SE5, selector SL6 to section SE6, selector SL7 to section SE7, selector SL8 to section SE8, selector SL9 to section SE9, selector SL10 to section SE10, selector SL11 to section SE11, selector SL12 to section SE12, selector SL13 to section SE13, selector SL14 to section SE14, and selector SL15 to section SE15.

As shown, both the selector and the section it is associated with display a numeric or alphanumeric key that visually relates the selector and section. As such, selector SL1 and section SE1 each display the numeric key "8", the selector SL4 and SE4 each display the alphanumeric key "T1", and the selector SL12 and SE12 each display the alphanumeric key "F5". For board 101, alphanumeric keys beginning with "F" are assigned to finger selectors and section, and alphanumeric keys beginning with "T" are assigned to toe selectors. Among other things, it is contemplated that displaying a key facilitates ready identification of the selector associated with a particular section. Use of a key thus causes the selector and section to visibly correspond to each other as the fact that they correspond can be determined by looking at the confirmation board apparatus.

Before a surgical procedure begins, an operating room nurse (or some other person assigned to do so) will identify the site that is the subject of the procedure, will identify the section on the chart that corresponds to that site, and will use the selector associated with that section to highlight the section. Highlighting the section on confirmation board apparatus 101 results in the section being illuminated such that it is readily identifiable by operating room personnel. As an example, if a particular procedure is to be performed on a patient's right thumb, the operating room nurse would highlight section SE14 (which displays the alphanumeric key "F1") by selecting selector SL14 (which also displays the alphanumeric key "F1"). Having selected a section in this manner, the posterior stop indicator 131 will be lit.

When a stop indicator 131 is lit, the surgical procedure should not proceed as a stop indicator 131 indicates that the required number of confirmations have not been received. As each of the selectors 127 is selected, an additional confirmation indicator 129 is lit. Once at least three of selectors 127 have been selected, all of the indicators 129 are lit, the stop indicator 131 turns off, and the start indicator 133 turns on. When indicator 133 turns on, the procedure can proceed. As can be seen in FIG. 4, the stop and start indicators 131 and 135 are at the top of board 101.

The authorized personnel selectors 127 preferably include selectors associated with a surgeon, an anesthesiologist, a circulating nurse, a radiologist, and a pathologist. However, in alternative embodiments, the selectors may be associated with one or more different personnel, may include selectors for additional personnel, or may include selectors for fewer personnel. For board 101, the stop sign lights up in red, the start sign and the "Yes" confirmation indicators 129 light up in green.

The confirmation board apparatus 101 may comprise any combination of parts and materials that allows it to function as described. As such, in some instances the views, start indicator, stop indicator, and confirmation indicators may comprise backlit translucent panels, while the selectors may comprise switches that are toggled when depressed. The selectors may in some instances be illuminated if they are used to select a body section and/or to enter a confirmation. In alternative embodiments, the confirmation board apparatus 101 may comprise a cathode ray tube, a liquid crystal display, one or more neon lights, or some other display device.

In board 101, the board provides information through a set of primary indicators that can be on or off. In alternative embodiments, other types of primary indicators and/or secondary indicators may be used. As an example, the board may have indicators that change color and/or light intensity depending on the current state of the board and/or the confirmation process.

Although the layout of the indicators, views, and selectors shown is thought to be an advantageous one, alternative embodiments may rearrange the elements shown, may include additional indicators, views, selectors or other elements, or may not include some of the elements of board 101. As an example of one of the many possible alternatives, another confirmation board apparatus may comprise only one stop indicator and only one start indicator that is used for both anterior and posterior procedures. In such an instances, the "Yes" confirmation indicators may be positioned in a line between the start and stop indicators.

Figure 7:
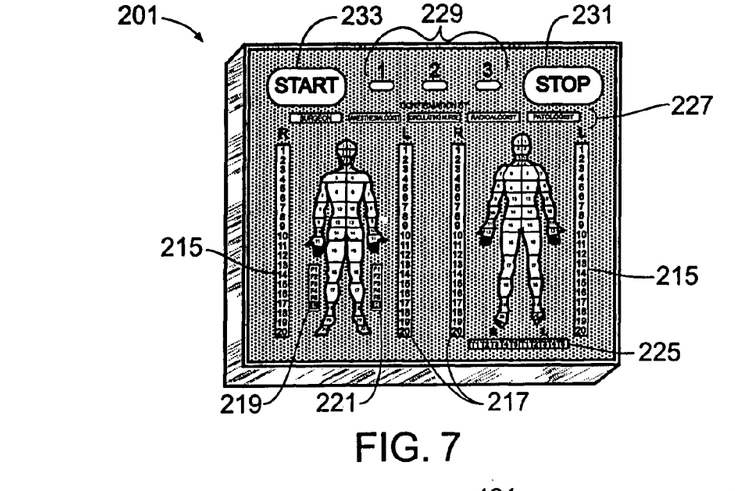
FIG. 7 is a perspective view of another confirmation board apparatus having a single pair of start and stop indicators, and single sets of confirmation selectors and indicators, in accordance with an exemplary embodiment of the invention.

In FIG. 7, a confirmation board apparatus 201 comprises a first, posterior, board segment 203 (i.e. the left half of board 201), and a second, anterior, board segment 205 (i.e. the right half of board 201). Each of the board segments 203 and 205 includes a view (207 or 209) of the human body, with a posterior view 207 being shown on the posterior board segment 103, and an anterior view 209 being shown on the anterior board segment 205. Each of the views 207 and 209 is divided into left and right sides 211 and 213. Each of the sides 211 and 213 is divided into 20 sections, each section being associated with a numeric key (1-20). Each finger of one view and each toe of another view is also a section, and is associated with an alphanumeric key. Each of the board segments 203 and 205 includes a left set of selectors 215 and a right set of selectors 217. The posterior board segment 203 also includes left finger selector set 219, and right finger selector set 221. The anterior board segment 205 includes left toe selector set 223, and right toe selector set 225. The confirmation board apparatus 201 differs from the apparatus 101 of FIGS. 4-6 in that the apparatus 201 includes only one start indicator, on stop indicator, and one set of confirmation indicators. As such, the confirmation board includes a single set of authorized personnel selectors 227, a set of confirmation indicators 229, a red stop indicator 231, and a green start indicator 233. In the board 201, the indicators 229 light up from left to right and, with the number shown above, indicate how many confirmations have been received. It is thought that having the selectors 227 themselves light up would also provided feedback as to who had provided the confirmations already received.

It should be noted that both the board 201 and the board 101 include more authorized personnel selectors than they do confirmation indicators. As such, the board 201 and 101 are useful where the method of preventing surgical error only requires three out of five authorized personnel to confirm the site selection by selecting an authorized personnel selector (127, 227) associated with them. However, it should be readily apparent that alternate confirmation boards may include different number of authorized personnel selectors (127, 227), a different number of confirmation indicators (129, 229), and/or a different ratio of personnel selectors to confirmation indicators.

Although the confirmation boards 101 and 201 each comprise all the views, selectors and indicators in a single unit, alternative embodiments may choose to move subsets of such input/output devices off the board. As an example, in FIG. 8, the confirmation board apparatus 301 includes a display board 302 that comprises only the views and indicators. The selectors 314 and 327 are part of the remote control units 304. In some instances, the board 301 can be positioned where it is readily viewable but not readily accessible, while the remotes 304 are positioned and/or carried elsewhere. The remote control unit 304A includes selectors 314 to perform site selection. The remote control units 304B can be carried by key personnel, and include selectors 327 to provide active confirmation of the site selection.

Figure 8:
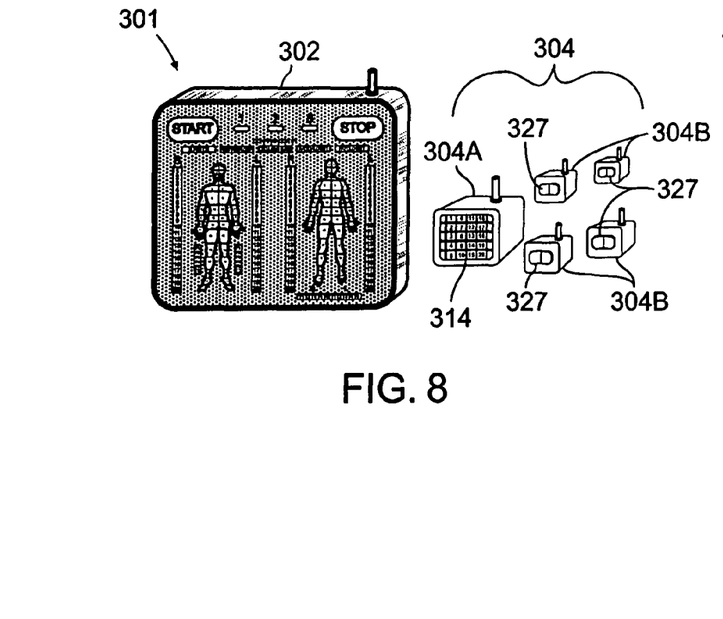
FIG. 8 is a perspective view of a remotely controlled wireless confirmation board apparatus in accordance with an exemplary embodiment of the invention.

With the confirmation board apparatus of FIG. 8, the selectors can be positioned off the board in a more accessible location, and possibly carried by key personnel the remote control units 304B are intended to be used by. If components are physically separated such as with units 302, 304A, and 304B, communication between components may be accomplished in any fashion. As such, various components may, among other possibilities, communicate via wired and/or wireless methods, may utilize encoding or decoding schemes, may utilize various forms of modulation and/or demodulation, and/or may utilize various forms of multiplexing and/or de-multiplexing.

In some instances, some surgical procedures may warrant confirmation from someone who is not near the board and/or is not part of the surgical team performing the procedure. As an example, a hospital may in some instances implement a procedure that requires concurrence by a surgeon not present, by a patient's personal physician, by a member of the hospital's administrative staff, or by some other person not present. In such instances, it is preferred that such a person be provided with a mechanism for providing active confirmation.

The boards 101, 201, and 301 may be self powered by including batteries or other energy storage units, or may be coupled to an external power source. If coupled to an external power source such as an electrical socket providing access to utility supplied power, the board may or may not include apparatus for conditioning and/or storing such power.

Figure 9:
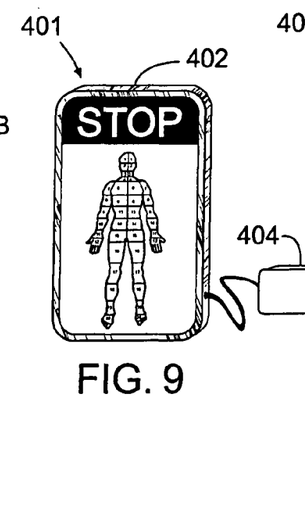
FIG. 9 is a first perspective view of a remotely controlled LED confirmation board apparatus in accordance with an exemplary embodiment of the invention.
Figure 10:
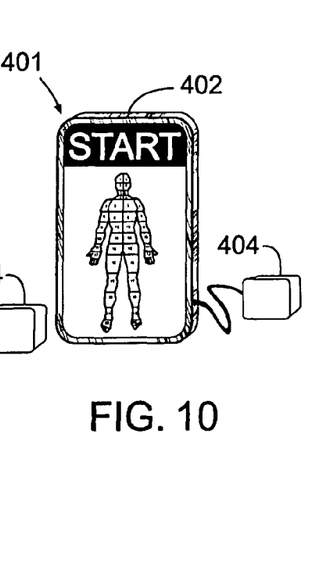
FIG. 10 is a second perspective view of the LED confirmation board apparatus of claim 9.

The confirmation boards apparatus described herein may comprise an onboard controller (i.e. within a case/body that is part of board 101) or may be controlled externally. In FIGS. 9 and 10, a confirmation board apparatus 401 includes a display board 402, and an external interface 404. The external interface 404 allows the display board 402 to communicate with an external controller (not shown).

The confirmation board apparatus 401 is an exemplary embodiment wherein the display board 402 is an LCD display. The use of an LCD or other type of display that can be dynamically updated provides numerous advantages. Among others, the display can be simplified so that it is easier to read. As an example, in FIG. 9, the display board 402 shows a "stop" status, i.e. there is no authority to proceed, and only shows only one image of a human body, in this instance a posterior view. In FIG. 10, the same view is shown, but the status has been changed to "start". The use of an LCD display allows, among others, easy updating of the confirmation board apparatus, allows customization of indicators to conform with procedures normally followed in the facility the apparatus is located in, and allows logic relating to what indicators are displayed in response to particular input to be software controlled.

Figure 11:
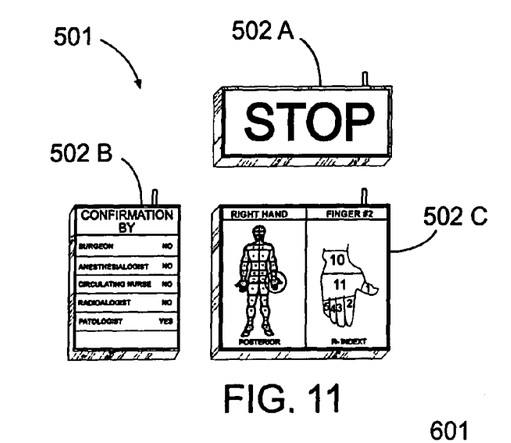
FIG. 11 is a first perspective view of multi-unit confirmation board apparatus in accordance with an exemplary embodiment of the invention.
Figure 12:
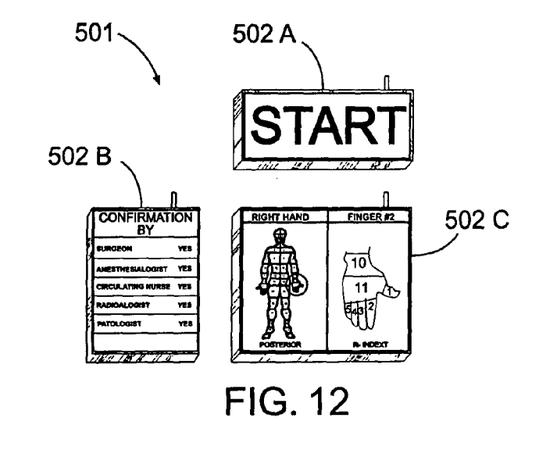
FIG. 12 is a second perspective view of the multi-unit confirmation board apparatus of FIG. 11.

FIG. 11 illustrates that a confirmation board apparatus may comprise multiple units, including multiple display boards. In FIG. 11, a confirmation board apparatus 501 includes a status display 502A, a confirmation display 502B, and an LCD site selection display 502C, and one or more remote input and control units (not shown). In FIG. 11, there is no authority to proceed as can be seen by the status display 502A showing a "stop" status, and the confirmation display 502B showing that only a single confirmation has been received. In FIG. 12, the confirmation display 502B shows that four confirmations have been received, and the display 502A shows that there is authority to proceed.

The apparatus of FIGS. 11 and 12 also illustrate a display board showing multiple views of the site selection. One view shows the site in relation to the entire body, the other shows the site in greater detail, either alone or in relation to other nearby sections of the body. The views also include text titles that further help identify the site, i.e. "left hand" and "index finger". The use of site specific text descriptions is also possible when a dynamic display such as an LCD screen is used. The use of a detailed view allows the display to provide additional information such as a precise view of the intended incision location and shape. It can also help improve identification of which section is selected by providing a larger view of the selected section.

Figure 13:
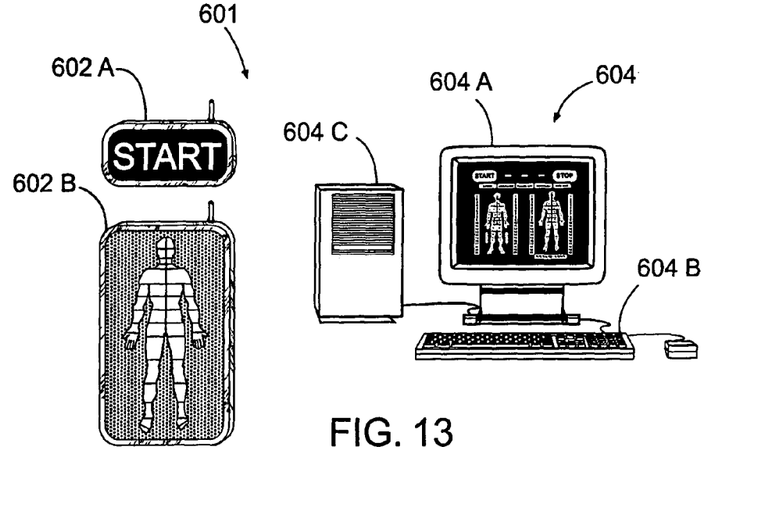
FIG. 13 is a perspective view of a computer controlled confirmation board apparatus in accordance with an exemplary embodiment of the invention.

In FIG. 13, an apparatus 601 includes display boards 602A and 602B, and a controller 604 that is a general purpose computer comprising a monitor 604A, a keyboard 604B, and a central processing unit 604C. The controller 604 is used for both site selection, and active confirmation by key personnel and modifies the display board 602A and 602B appropriately. In some instances, the controller 604 may include tools that facilitate site selection and active confirmation. In some instances, the controller 604 may be able to communicate with, or be part of other data systems having patient and procedure related data. If site selection is not done by interacting with the display board, the body sections need not include the alphanumeric keys that some of the other embodiments include.

It is contemplated that some embodiments may only include a start/stop display 602A, particularly if site selection and confirmation is accomplished by using some other apparatus such as the controller 604.

In some instances confirmation board apparatus as described herein may be suited only for indicating a single section per confirmation, while in others in may be suitable for indicating a plurality of sections simultaneously and/or in a particular sequence.

It is contemplated that most embodiments will be reusable in that the confirmation board apparatus can be reset after a procedure has been completed such that no sections are highlighted, or that only the section corresponding to an upcoming procedure is highlighted. Resetting the board would generally also change the status of all confirmation indicators to reflect that no active confirmations have occurred immediately after the change. As such, some embodiments will comprise a mechanism for doing one or more of the following: (a) turning off all highlighting and/or indicators; (b) turning off a start indicator; (c) turning on a stop indicator; (d) turning off a confirmation indicator; and (e) resetting any confirmation count indicator.

Although the display portions of the confirmation board apparatus described herein are preferably displayed in the operating room where the surgical procedure is to take place, in some instances it may be positioned elsewhere such as in a room where operating room personnel wait or prepare themselves prior to beginning a surgical procedure. However, if it is positioned in the operating room such that it is visible to a significant number of operating personnel, it may be possible for personnel who did not participate in the confirmation process to help prevent errors by being aware, from the board, of the proper section to be operated on and voicing concerns if it appears an error is being made.

It is contemplated that, among other things, the use of confirmation board apparatus as described herein improves safety, reduces the possibility of a surgical procedure being performed on the wrong side and/or wrong section of a patient, and helps prevent costly legal actions against the hospital and other health care providers.

What is claimed is:

1. A surgical procedure confirmation board apparatus comprising:
   an image of a human body that is visibly divided into sections;
   a mechanism for visibly highlighting a section of the image wherein a proposed surgical procedure is to be performed;
   a first surgical procedure stop indicator;
   a first surgical procedure start indicator; and
   a mechanism for visibly highlighting the first stop indicator and the first start indicator, the first stop indicator being highlighted until a surgical procedure is cleared to proceed on the highlighted section of the image, whereupon the mechanism turns on highlight of the first start indicator and turns off highlight of the first stop indicator.

2. The confirmation board apparatus of claim 1 comprising:
   a first, posterior, board segment including a first, posterior, image of a human body where the first image is visibly divided into a first, left, side and a second, right, side, the first side and second side each being visibly divided into sections; and
   a second, anterior, board segment including a second, anterior, image of a human body where the second image is visibly divided into a third, left, side and a fourth, fight side, the third side and fourth side each being visibly divided into sections; and
   a mechanism for visibly highlighting individual sections of the sections of the first, second, third, and fourth sides.

3. The confirmation board apparatus of claim 2 further comprising:
   a plurality of site selectors wherein each selector of the plurality of site selectors is associated with a single section of the sections of the first, second, third, and fourth sides, each selector being operable to turn on and off visible highlighting of its associated section.

4. The confirmation board apparatus of claim 3 wherein:
   at least ten sections visibly correspond to fingers, and the plurality of site selectors includes at least a set of ten finger selectors, each finger selector being associated with a section visibly corresponding to a finger; and
   at least ten sections visibly correspond to toes, and the plurality of site selectors includes at least ten toe selectors, each toe selector being associated with a section visibly corresponding to a toe.

5. The confirmation board apparatus of claim 4 wherein each selector visibly includes an alphanumeric indicator that is also visibly included on the section the selector is associated with.

6. The confirmation board apparatus of claim 5 wherein:
   the plurality of physically separate selector sets include
   a first set of selectors that includes selectors corresponding to sections of the first side,
   a second set of selectors that includes selectors corresponding to sections of the second side;
   a third set of selectors that includes selectors corresponding to sections of the third side;
   a fourth set of selectors that includes selectors corresponding to sections of the fourth side; and
   one or more sets that include finger and toe selectors.

7. The confirmation board apparatus of claim 6 wherein:
   the one or more sets that include finger and toe selectors include a fifth set of selectors that includes finger selectors associated with left hand finger sections,
   and a sixth set of selectors that includes finger selectors associated with right hand finger sections.

8. The confirmation board apparatus of claim 7 wherein:
   the one or more sets that includes finger and toe selectors includes a set of selectors for all toe sections.

9. The confirmation board apparatus of claim 8 wherein:
   the second and third selector sets are positioned between the first and second images;
   the first selector set is positioned to a side of the first image opposite the second selector set;
   the fourth selector set is positioned to a side of the second image opposite the third selector set;
   the fifth selector set is positioned between the first selector set and the first image;
   the sixth selector set is positioned between the second selector set and the first image; and
   the toe selector set is positioned below the second image.

10. A surgical procedure confirmation board apparatus comprising:
    an image of a human body that is visibly divided into sections;
    a mechanism for visibly highlighting individual sections of the image;
    a first stop indicator;
    a first start indicator;
    a mechanism for highlighting the first stop and first start indicator;
    a first plurality of personnel confirmation indicators;
    a mechanism for visibly highlighting individual personnel confirmation indicators of the first plurality of confirmation indicators; and
    a first plurality of personnel selectors, each personnel selector of the first plurality of personnel selectors being associated with a personnel confirmation indicator of the first plurality of personnel confirmation indicators and being operable to turn on and off visible highlighting of its associated personnel confirmation indicator.

11. The confirmation board apparatus of claim 10 further comprising a control mechanism that turns on highlighting of the first start indicator and turns off highlighting of the first stop indicator if the first plurality of personnel selectors have been used to turn on highlighting of all of the first plurality of personnel confirmation indicators.

12. The confirmation board apparatus of claim 10 further comprising:
    a second stop indicator;
    a second start indicator;
    a second plurality of personnel confirmation indicators;
    a second plurality of personnel selectors, each personnel selector of the second plurality of personnel selectors being associated with a personnel confirmation indicator of the second plurality of personnel confirmation indicators and being operable to turn on and off visible highlighting of its associated personnel confirmation indicator.
    a mechanism for visibly highlighting individual indicators from among the second stop indictor, second start indicator, and the personnel confirmation indicators of the second plurality of confirmation indicators; and
    a control mechanism that turns on highlighting of the second start indicator and turns off highlighting of the second stop indicator if the second plurality of personnel selectors have been used to turn on highlighting of all of the second plurality of personnel confirmation indicators.

13. The confirmation board apparatus of claim 12 wherein:
    the board comprises a mechanism that operates to turn off highlighting of any start indicators and turn on highlighting of a stop indicator if a selector of any of the plurality of site selectors is selected; and
    the board comprises a mechanism that operates to turn off highlighting of any confirmation indicators if a selector of any of the plurality of site selectors is selected.

14. The confirmation board apparatus of claim 13 wherein:
    the first stop indicator, the first start indicator, the first plurality of personnel confirmation indicators, and the first plurality of personnel selectors are positioned on the posterior board segment, closer to the first image than to the second image; and
    the second stop indicator, second start indicator, the second plurality of personnel confirmation indicators, and the second plurality of personnel selectors are positioned on the anterior board segment, closer to the second image than to the first image.

15. The confirmation board apparatus of claim 1 further comprising:
a mechanism for receiving an input indicating that highlighting of a particular section is to be turned on.

16. A method for preventing surgical errors comprising:
displaying an image of a human body on an electronic confirmation board;
displaying on the electronic confirmation board a start indicator and a stop indicator where only one of the start and stop indicators is highlighted;
selecting a section of the image of the human body to be highlighted, where the highlighted section corresponds to the site of a surgical procedure to be performed and where such selection causes the stop indicator to be highlighted; and
highlighting the start indicator when a surgical procedure is to proceed on the highlighted section.

17. The method of claim 16 further comprising:
having a first person responsible for verifying whether a currently highlighted section of the image corresponds to the site at which the surgical procedure is to be performed; and
if the highlighted section corresponds to the site at which the surgical procedure is to be performed, having the first person select a selector that causes a confirmation indicator associated with the first person to be highlighted.

18. The method of claim 16 further comprising:

having a plurality of people who are each responsible for determining whether a currently highlighted section of the image corresponds to the site at which the surgical procedure is to be performed; and if the highlighted section corresponds to the site at which the surgical procedure is to be performed, having each person select a selector that causes a confirmation indicator associated with that person to be highlighted.

19. The method of claim 18 wherein:

highlighting of any stop indicators is turned off, and highlighting of a start indicator is turned on, when confirmation by selector selection has been performed by all persons having an associated confirmation indicator.

* * * * *